Sept. 20, 1927.
W. E. McDONELL ET AL
1,643,219
OPHTHALMIC MOUNTING
Filed Oct. 20, 1921
2 Sheets-Sheet 1
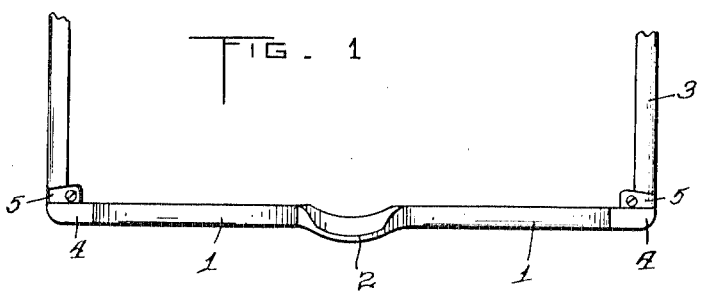
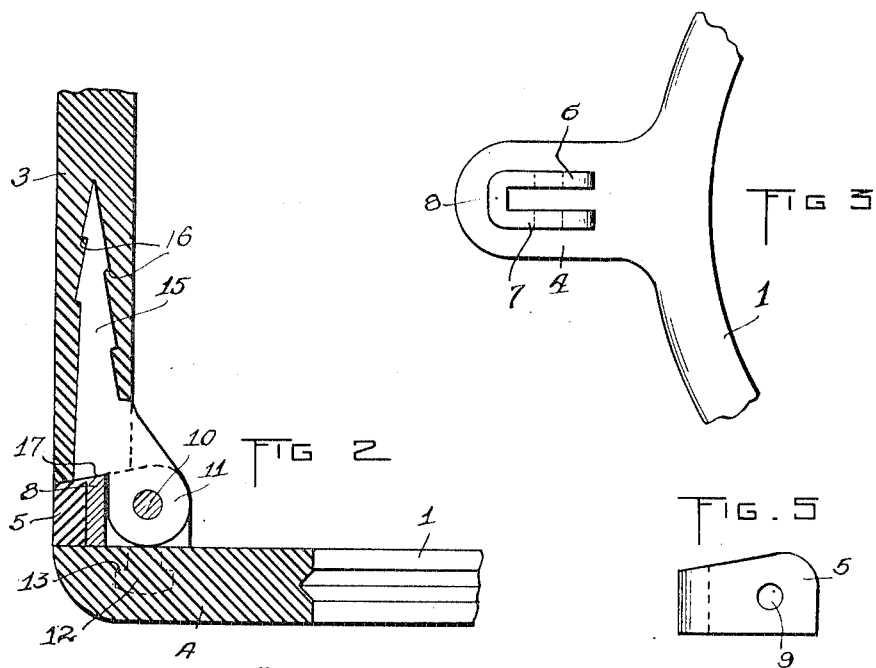
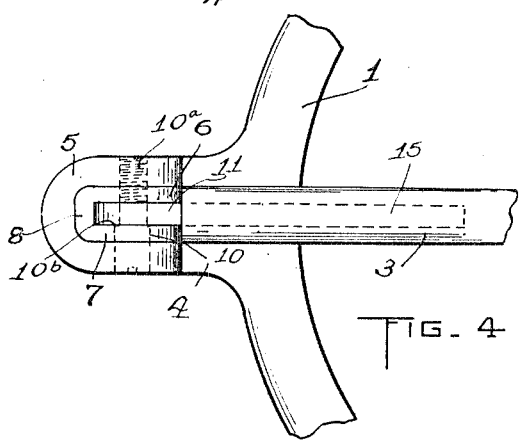

Sept. 20, 1927.
W. E. McDONELL ET AL
1,643,219
OPHTHALMIC MOUNTING
Filed Oct. 20, 1921
2 Sheets-Sheet 2
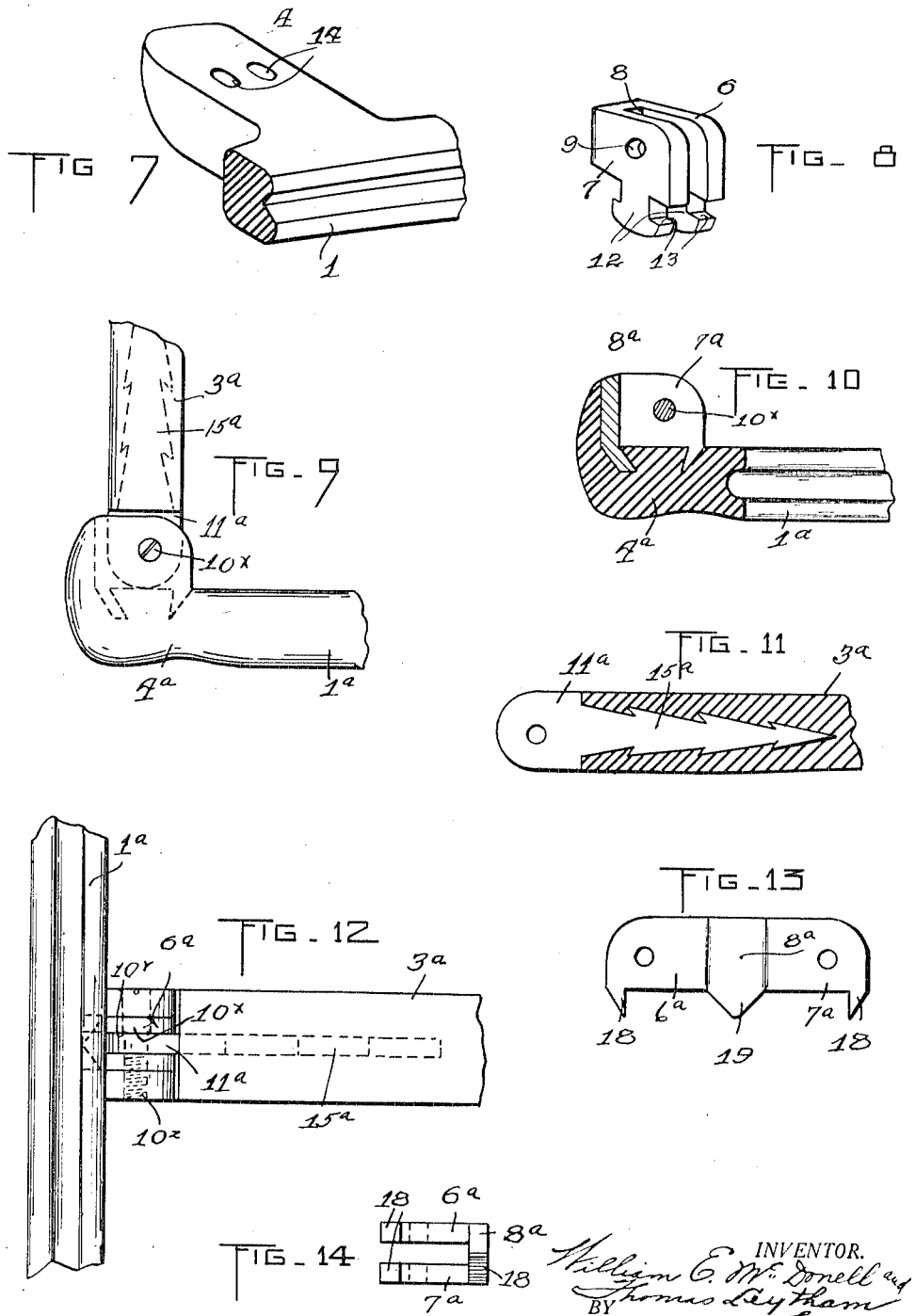
INVENTOR.
William E. McDonell and
Thomas Leytham
BY
Davis & Swims
ATTORNEYS.

Patented Sept. 20, 1927.

1,643,219

UNITED STATES PATENT OFFICE.

WILLIAM E. McDONELL AND THOMAS LEYTHAM, OF ROCHESTER, NEW YORK, ASSIGNORS, BY MESNE ASSIGNMENTS, TO SHUR-ON STANDARD OPTICAL COMPANY, INC.

OPHTHALMIC MOUNTING.

Application filed October 20, 1921. Serial No. 509,141.

The present invention relates to ophthalmic mountings and more particularly to the type provided with temples and formed wholly or mostly part of cellulose material, an object of this invention being to provide a strong and durable connection between the temples and the lens frames. A further object of the invention is to provide in a mounting with non-metallic frames, metallic hinges for the temples, which will be inconspicuous, strong and durable. A still further object of the invention is to do away in a non-metallic lens frame with what is commercially known as the "drop temple", that is, one that is so loose that it folds inwardly by gravity. Another and still further object of the invention is to enable the temple pivots to be arranged more closely to the lenses in that type of mounting made mostly of non-metallic material. Another object of the invention is to provide a metal insert acting as a pivot piece for a temple and so covered as to be invisible from the front or either side of the mounting. A still further object of the invention is to provide a construction in which a metallic pivot insert may be attached to the rear face of the lens frame and may thereafter be covered to provide a pocket about the same which will render the insert invisible from the front or either side of the mounting.

To these and other ends, the invention consists of certain parts and combinations of parts, all of which will be hereinafter described, the novel features being pointed out in the appended claims.

In the drawings:

Fig. 1 is an edge view of an ophthalmic mounting constructed in accordance with this invention, the temples being only partly shown;

Fig. 2 is an enlarged section showing the manner in which the temple connects with the lens frame;

Fig. 3 is a detail view showing the insert applied to the rear face of the lens frame extension, the pocket forming member being removed;

Fig. 4 is a fragmentary view of one of the lens frames showing a fragment of a temple connected thereto;

Fig. 5 is a side view of the pocket forming member;

Fig. 6 is a rear view of the pocket forming member;

Fig. 7 is a fragmentary perspective view of one of the lens frames, showing a rear view of its extension;

Fig. 8 is a perspective view of one of the metallic inserts or pivoting pieces;

Fig. 9 is an edge view of a fragment of another embodiment of the invention showing a fragment of one of the temples connected therewith;

Fig. 10 is a horizontal section through the embodiment shown in Fig. 9;

Fig. 11 is a sectional view through the temple employed in Fig. 9;

Fig. 12 is a view looking from the inner side of a fragment of a lens frame of the embodiment illustrated in Fig. 9 showing a temple connected with a lens frame;

Fig. 13 is a view of the blank employed in Fig. 9 before such blank is folded; and Fig. 14 shows the blank folded ready for attachment to a lens frame.

Referring more particularly to the drawings, 1 indicates the lens frames connected by a bridge 2. The lens frames and bridge are, in this instance, both made of non-metallic material such as a cellulose compound like pyroxylin, celluloid, etc. The temples 3 are, in this instance, formed of similar material and are pivotally connected with the lens frames.

With the end in view of providing between each temple and its lens frame a pivotal connection which will be invisible from the front and sides of the mounting and will, at the same time, be of strong and durable construction, there may be provided on each lens frame a projection or extension 4 which extends outwardly and rearwardly, each projection having a pocket recess or socket which opens inwardly and rearwardly and is closed at the side, the top and the bottom of the mounting. The side walls of this pocket are parallel and the parallel side walls are connected by a transversely extending wall and the bottom of the pocket is flat.

In the embodiment shown in Figs. 1 to 8, each of these pockets is provided by a pocket forming member 5, formed of non-metallic material and separately from the main portion of the extension 4 and cemented to the rear face of such main portion of the extension. Within this pocket is the pivoting piece or metal insert or hinge member which comprises preferably an upper leaf portion 6 engaging and tightly fitting the upper side wall of the pocket, a lower leaf portion 7 abutting and tightly fitting the lower side wall of the pocket and a connecting portion 8 abutting and tightly fitting the outer or transverse wall of the pocket. With the end in view of securing the insert within the pocket, the former has prongs or off-set wings 12 with shoulders 13 anchored or embedded in the front or bottom wall of the pocket, one of said prongs being provided on the upper wall and the other prong being provided on the lower wall. In this embodiment before the pocket forming member 5 is applied, the main portion of the extension 4 is formed with two circular openings 14, the diameter of these openings being less than the greatest cross dimension of one of the prongs 12. The two prongs 12 are heated and are then forced into the openings 14, the material flowing about the anchoring prongs or projections and in back of the shoulders 13, the insertion being continued until the inner walls of the portions 6, 7 and 8 abut the rear face of the extension 4. After this abutment takes place, the parts are permitted to cool and the insert is permanently anchored to the non-metallic part. The pocket forming member 5 is thereafter molded about the insert and at its forward edge is cemented or otherwise secured to the rear face of the main portion of the extension 4.

The upper and lower side walls of each pocket are provided with alined openings 9 through which a screw fastener 10 is passed to serve as a pivot for the temple 3. The screw fastener is threaded at 10ª to engage in the top portion 6 of the insert and the upper opening 9 of the pocket forming member 5. A shoulder 10ᵇ formed on the fastener is adapted to engage with the lower side of the pivot piece or terminal 11 of the temple in order to draw the latter firmly against the upper wall of the insert.

The hinge member or pivot eye 11 may have a slender prong or reinforcing projection 15 formed with shoulders 16 and this prong portion is heated and forced into an opening recess or socket which is made into the forward end of the non-metallic portion of the temple, the opening being less in diameter than the greatest cross diameter of the prong 15, and the material of the temple flowing back of the shoulders 16 and serving to hold the prong 15 after the parts have been cooled. The pivot piece 11 has a shoulder 17 at one side for engagement with the connecting portion 8 in order to limit the outward movement of the temple. The inner or forward end of the non-metallic portion of the temple conforms exteriorly to the exterior of the pocket forming member 5, so that when the temple is moved to its outermost position on the lens frame, the pocket forming member forms a substantial continuation of the temple.

In the embodiment of the invention illustrated in Figs. 9 to 14 the lens frames 1ª are each provided with outwardly and rearwardly projecting extensions 4ª at their outer sides and these extensions have pockets molded on their inner faces and opening rearwardly and inwardly, being closed in an upward and downward direction. In these pockets the metal inserts or hinge members are arranged. These metal inserts, in this instance, each comprise an upper leaf portion 6ª and lower leaf portion 7ª and connecting portion 8ª, the upper and the lower portion tightly engaging the upper and the lower wall of the pocket and the connecting portion tightly engaging the transverse wall of the pocket. The insert is secured in the pocket through prongs anchored in the forward wall of the pocket. In this instance, the forward wall has three recesses formed therein, these recesses being, in this instance, cut or drilled in the forward wall, one in converging relation to the other two. The prongs 18 on the portions 6ª and 7ª are deflected in one direction and are driven into these last mentioned two openings, the deflection being shown in Figs. 9 and 10 and the normal positions of the prongs being illustrated in Fig. 13. The connecting portion 8ª of the insert has a prong 19 which is deflected toward the prongs 18 when the insert is driven into the pocket, this deflection being accomplished through engagement of the prong 19 with the walls of the recess which the prong enters in the front wall of the pocket. The temple 3ª has a terminal or pivoting piece 11ª formed with a prong 15ª secured to the non-metallic material of the temple in the same manner as the prong 15 in the embodiment shown in Figs. 1 to 8. A pivot pin 10ˣ with a shoulder 10ʸ and a screw threaded portion 10ᶻ serves to hold the pivot piece 11ª in the insert.

In both illustrated embodiments of the invention a metal insert or pivoting piece for the temple terminal is secured in a pocket in the rear face of the lens frame, this pocket being closed at its top, bottom and outer side so that the metallic pivoting piece is invisible in use. The pocket is formed in an outward and rearward extension on the lens frame, and the pivoting piece or insert is formed with portions abutting the top, the bottom and the outer side walls of the pocket. The pivoting piece has its top and bottom portions formed with prongs which are anchored in the font wall of the pocket. The temple has a metallic pivoting piece which is anchored in a non-metallic portion and cooperates with the pivoting piece of the lens frame to limit the outward movement of the temple. The metallic pivoting pieces on both parts permit a tight hinge to be obtained so that the undesirable "drop temple" is eliminated. The pocket in one embodiment is formed by a separate piece, thus permitting the pivoting piece to be secured to the lens frame by imbedding the prongs in the non-metallic material while the prongs are hot.

What we claim as our invention and desire to secure by Letters Patent is:

1. An ophthalmic mounting comprising a lens frame having an extension at its outer edge formed with a pocket opening rearwardly and inwardly, a metal insert in said pocket provided with a pocket opening rearwardly and inwardly, and a temple having a terminal pivotally mounted in the pocket of the metal insert.

2. An ophthalmic mounting comprising a lens frame having a projection extending outwardly and rearwardly from the frame the rearwardly projecting portion having on its rear face a pocket closed on its outside and opening rearwardly and inwardly a metal insert provided with an upper and a lower portion and a connecting portion, the connecting portion abutting the outer wall of the pocket, the upper and lower portions abutting respectively the upper and lower walls of the pocket, and a temple having a terminal pivotally mounted between said upper and lower portions of the metal insert.

3. An ophthalmic mounting comprising a lens frame having a projection extending outwardly and rearwardly from the frame, the rearwardly projecting portion having a pocket closed on its outside and opening rearwardly and inwardly, a metal insert provided with an upper and a lower portion and a connecting portion, the connecting portion abutting the outer wall of the pocket, the upper and lower portions abutting respectively the upper and lower walls of the pocket, prongs carried by said insert and anchored in the projection, and a temple having a terminal pivotally mounted between said upper and lower portions of the insert.

4. An ophthalmic mounting comprising a frame of non-metallic material, having an extension at its outer edge, a U shaped member having prongs on each arm thereof embedded in the rear face of the extension, a pivot pin extending between the two arms of the U shaped member, and a temple having a portion surrounding said pivot pin between the two arms.

5. An ophthalmic mounting comprising a lens frame of non-metallic material having an extension extending outwardly and rearwardly from the frame, said rearwardly extending portion being provided with a pocket closed on its outer side and opening rearwardly and inwardly, a metal insert arranged in the pocket and provided with an upper portion cooperating with the upper wall of the pocket, a connecting portion cooperating with the outer wall of the pocket and a portion cooperating with the bottom wall of the pocket, prongs extending from the upper and lower portions of the insert and anchored in the front wall of the pocket, and a temple having a terminal pivotally mounted between the upper and lower portions of the metal insert.

6. An ophthalmic mounting comprising a lens frame of non-metallic material having an extension extending outwardly and rearwardly from said frame, the rearwardly extending portion being provided with a pocket which opens rearwardly and inwardly and is closed on its outer and front side, a metal insert secured in said pocket and formed by an upper and a lower portion and a connecting portion, the upper and lower portions abutting the upper and lower walls of the pocket and the connecting portion abutting the outer wall of the pocket, prongs extending from the upper and lower portions of the metal insert and anchored in the front wall of the pocket, a pivot screw extending through the metal insert and the upper and lower walls of the pocket, and a temple having a terminal received between the upper and lower portions of the metal insert.

7. An ophthalmic mounting comprising a frame of non-metallic material, a metal temple pivoting piece having a projection anchored in the frame, and a U shaped piece of non-metallic material fitted about the metal temple pivoting piece and forming a pocket closed at the outer side and opening to the rear and to the inner side of the mounting.

8. An ophthalmic mounting comprising a frame of non-metallic material, a pair of temple attaching ears having a connecting portion on the outer side thereof and provided with a projection anchored in the non-metallic material, and a U shaped piece of non-metallic material fitted about the temple pivoting piece and forming a pocket closed at the outer side and opening to the rear and to the inner side of the mounting.

9. An ophthalmic mounting comprising a lens frame of non-metallic material having a pocket on its rear face closed at its top, bottom and outer side, a metal pivoting piece anchored in the pocket, and a temple having an inner portion formed of non-metallic material and provided with a metallic pivoting piece embedded in such material, pivotally mounted on the anchoring piece of the lens frame, and cooperating with such metallic pivoting piece to limit the outward movement of the temple.

10. An ophthalmic mounting comprising a lens frame of non-metallic material having an outward and rearward extension formed with a pocket on its rear face closed at its top, bottom and outer side, a metal pivoting piece anchored in the pocket, and a temple having an inner portion formed of non-metallic material and provided with a pivoted piece anchored to the metallic pivoting piece of the lens frame, the non-metallic portion of the temple co-operating with the outward and rearward extension in such a manner that the rearwardly extending portion appears as part of the non-metallic portion of the temple.

11. The combination of a lens frame, a projection extending outwardly therefrom, a temple in butt-joint engagement with said projection, a combined hinge plate and hinge knuckle countersunk in one of said two last named elements, and a device carried by the other of said elements and pivotally connected with said knuckle to pivotally attach said temple to said lens frame.

12. The combination of a lens frame, a projection extending radially outward therefrom and having a recessed extension perpendicular to the plane of the lens frame, a temple in butt-joint engagement with said extension, a hinge member located in the recess of said extension, a cooperating hinge member projecting from the end of said temple and cooperating with said first named hinge member to form a hinge knuckle lying entirely within said recess, and a pivot pin extending through said hinge members to pivotally connect said temple with said lens frame.

13. An ophthalmic mounting comprising a non-metallic lens frame having a non-metallic extension, a reinforcing piece arranged in said extension, and a temple pivotally connected to said reinforcing piece.

14. An ophthalmic mounting comprising a non-metallic frame having a non-metallic extension at one side thereof, a reinforcing piece embedded in said extension and provided with anchoring prongs, and a temple pivotally connected to said reinforcing piece.

15. An ophthalmic mounting comprising a non-metallic lens frame, a temple having an inner end of non-metallic material and a hinged connection between the temple and the frame embodying two metallic members, each having an irregularly shaped portion, one embedded in the lens frame and the other embedded in the temple.

16. A hinge joint for connecting the temple bars to the spectacle lens frames comprising socketed portions thereof, and hinge leaves secured respectively within said socketed portions.

17. In a mounting of the character described, the combination with a composition frame portion, of a metallic joint member having a reinforcing projection embedded within the composition member and terminating in a pivot eye, a second member having its pivot eye overlying the first, and means passing through the eyes for pivotally connecting the parts.

18. A composition ophthalmic frame including a temple section and a frame section, one of said parts having embedded therein a slender metallic reinforcement terminating in a projecting eye, and means engaged in the eye for pivotally connecting the parts.

19. In the hingedly connecting of the frame and bows of non-metallic spectacles, a hinge comprising a pair of members, each hinge member being arranged with integral members and attachment means, and said bows and frame arranged for the insertion and embedment therein of the attachment means of the hinge members to mount the hinge members thereon.

20. In the hingedly connecting of the frame and bows of non-metallic spectacles, a hinge comprising a pair of members, each hinge member having a base portion arranged with integral knuckles and attachment means and the attachment adapted to engage and be secured in recesses arranged in the bows and frame.

21. The hingedly connecting of the frame and bows of non-metallic spectacles, consisting in providing a hinge comprising a pair of members, arranging each hinge member with a perforated member and an attachment member, and anchoring said attachment member in the material of the bows and frame to mount the hinge members thereon.

22. In a mounting of the character described, the combination with a composition portion, of a metallic joint member having a reinforcing projection embedded within the composition member and terminating in a pivot eye.

23. An ophthalmic mounting comprising a member constituted of plastic material having a recess, a hinge member seated within the recess, and projections at the bottom portion of the hinge member embedded within the plastic material.

24. An ophthalmic mounting comprising a member constituted of plastic material having a recess in the rear face provided with parallel side walls, a hinge member seated within the recess and having parallel walls in tightly fitted contact with the walls of the recess, and means for securing the hinge member to the member of plastic material.

25. An ophthalmic mounting comprising a member constituted of a plastic material having a recess provided with longitudinally extending walls connected by a transversely extending wall, and a hinge member seated within the recess having walls in tightly fitted contact with the recess walls and having an offset wing embedded within the plastic member.

26. An ophthalmic mounting comprising a member constituted of plastic material having a recess, and a hinge member seated within the recess substantially flush with the top of the recess and having an integral projecting part biting into and embedded within the material.

27. The combination with a member constituted of plastic material having a recess, of a hinge member seated in the recess and having a projecting part embedded within the member.

WILLIAM E. McDONELL.
THOMAS LEYTHAM.